US010127366B2

(12) United States Patent
Kohli

(10) Patent No.: US 10,127,366 B2
(45) Date of Patent: Nov. 13, 2018

(54) SYSTEMS AND METHODS FOR PAIRED DEVICE AUTHENTICATION

(71) Applicant: MasterCard International Incorporated, Purchase, NY (US)

(72) Inventor: Manoneet Kohli, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 155 days.

(21) Appl. No.: 15/090,311

(22) Filed: Apr. 4, 2016

(65) Prior Publication Data

US 2017/0286656 A1    Oct. 5, 2017

(51) Int. Cl.
| | |
|---|---|
| G06F 21/32 | (2013.01) |
| G06F 21/34 | (2013.01) |
| G06F 21/35 | (2013.01) |
| H04L 29/06 | (2006.01) |
| H04W 12/06 | (2009.01) |

(52) U.S. Cl.
CPC .............. G06F 21/32 (2013.01); G06F 21/34 (2013.01); G06F 21/35 (2013.01); H04L 63/0428 (2013.01); H04L 63/0853 (2013.01); H04L 63/0861 (2013.01); H04W 12/06 (2013.01); H04L 2209/80 (2013.01)

(58) Field of Classification Search
CPC ................................................. H04L 63/0861
See application file for complete search history.

(56) References Cited

U.S. PATENT DOCUMENTS

| | | | |
|---|---|---|---|
| 8,099,363 | B1 | 1/2012 | Kilchenstein, Jr. |
| 8,112,066 | B2 | 2/2012 | Ben Ayed |
| 8,190,129 | B2 | 5/2012 | Ben Ayed |
| 8,260,262 | B2 | 9/2012 | Ben Ayed |
| 8,498,618 | B2 | 7/2013 | Ben Ayed |

(Continued)

FOREIGN PATENT DOCUMENTS

| | | |
|---|---|---|
| EP | 2493144 B1 | 6/2014 |
| GB | 2368951 A | 5/2002 |

OTHER PUBLICATIONS

PCT International Search Report and Written Opinion, Application No. PCT/US2017/024414, dated Jun. 19, 2017, (14 pps.).

*Primary Examiner* — Josnel Jeudy
(74) *Attorney, Agent, or Firm* — Armstrong Teasdale, LLP

(57) ABSTRACT

A pair of remote computing devices for authenticating a user of one of the pair of remote computing devices is provided. The pair of remote computing devices includes a first computing device and a second computing device. The first computing device communicates with a host computing device and stores sample biometric data associated with the user. The first computing device receives an authentication request message for authenticating the user, processes the authentication request message, and transmits a biometric request message to the second computing device. The first computing device also receives captured biometric data from the second computing device, electronically compares the captured biometric data to the sample biometric data, and transmits an authentication response message to the host computing device based upon the comparison of the captured biometric data to the sample biometric data. The authentication response message indicates whether the captured biometric data matched the sample biometric data.

26 Claims, 7 Drawing Sheets

(56) References Cited

U.S. PATENT DOCUMENTS

| | | | |
|---|---|---|---|
| 8,577,810 B1 | 11/2013 | Dalit et al. | |
| 8,850,196 B2 | 9/2014 | Blanco et al. | |
| 8,990,895 B2 | 3/2015 | Nosrati | |
| 9,277,407 B2 | 3/2016 | Blanco et al. | |
| 2003/0115142 A1 | 6/2003 | Brickell et al. | |
| 2003/0172027 A1 | 9/2003 | Scott | |
| 2007/0150415 A1* | 6/2007 | Bundy | H04L 9/0866 705/51 |
| 2011/0145899 A1 | 6/2011 | Cao et al. | |
| 2011/0289004 A1 | 11/2011 | Prakash et al. | |
| 2013/0189925 A1* | 7/2013 | Staskawicz | H04B 7/24 455/41.1 |
| 2015/0278498 A1* | 10/2015 | Hong | G06F 21/32 340/5.82 |
| 2016/0019547 A1* | 1/2016 | Gurnani | G06Q 20/40145 705/44 |
| 2016/0103984 A1* | 4/2016 | Warrier | G06F 21/32 713/186 |

\* cited by examiner

SYSTEMS AND METHODS FOR PAIRED DEVICE AUTHENTICATION

BACKGROUND

The field of the invention relates generally to authenticating a user of a computing device, and more particularly, to a network-based system and method for authenticating a user of a first computing device using authentication information provided through a second computing device that is paired with the first computing device.

Merchants and retailers are often on the front lines of managing payment card fraud. At least some online businesses or merchants that offer sales online face a unique challenge because at least some purchases initiated with these merchants are referred to as "card-not-present" transactions. In other words, at least some purchases are made without a merchant being able to inspect a payment card being used in the purchase and without a merchant physically swiping the payment card. Today, most card-not-present fraud takes place on the Internet, although some criminals perpetrate the fraud through call center operations, the mail system, and the like.

In a card-not-present transaction, the merchant releases the items purchased with an understanding that the actual cardholder initiated the purchase and that the actual cardholder will make the necessary payment. In this case, because the cardholder is not present at the merchant when making the purchase, the items purchased are often delivered to an address selected by the cardholder at the time of the transaction. Due to the anonymity of a purchaser during such an online transaction, fraud may occur. That is, unauthorized users may purchase items online using a victim's account information. In some cases, a thief only needs the card number itself to make an online purchase. However, because the payment card information input by the thief is drawn to a valid account, a merchant is typically unaware of the fraud until after the fact.

In an attempt to increase security, online merchants may request additional information about the payment card (e.g., CSC, CVC, CVV codes) or additional information from the cardholder such as an address, phone number, email, answers to previously asked security questions, and the like. However, card information and personal information about a cardholder are also susceptible to being obtained by a thief. For example, criminals may infiltrate legitimate corporations and user their employment as a means for accessing customer and credit card information and subsequently use this information to commit fraud. This type of fraud, referred to as skimming, usually occurs when the credit card information is obtained by a dishonest employee or agent of a legitimate merchant. Skimming often takes place in restaurants and bars where the skimmer has possession of the victim's credit card outside of their view.

Phishing is another criminal activity whereby fraudsters attempt to acquire sensitive information, such as credit card numbers, addresses, social security numbers, drivers' license numbers, usernames, and passwords by appearing as a trustworthy organization in an electronic communication. Phishing is typically carried out by email or instant messaging, and often directs users to provide the sensitive information on a website monitored by the criminals, although phone contact may also be used.

Spyware or malware may also be used by criminals to obtain payment card information about a cardholder. Spyware is often attached to trusted data downloaded by a person, such as emails, files, and the like. Spyware covertly gathers cardholder information without the cardholder's knowledge. Typically, the software monitors a user's activity online while remaining in the background and transmits information about the user's activity to another device controlled by the thief. Any kind of data a user enters online including an email address, username, password, credit card number, and the like, may be gathered and used by a third party criminal.

Therefore, an authentication system is needed which is capable of verifying that a user of a computing device that is initiating a purchase with a payment card is the actual cardholder of the payment card, and is in possession of the payment card at the time of the purchase.

BRIEF DESCRIPTION OF THE DISCLOSURE

In one aspect, a pair of remote computing devices for authenticating a user of one of the pair of remote computing devices is provided. The pair of remote computing devices includes a first computing device and a second computing device. Each computing device includes a processor and a memory. The first computing device communicates with a host computing device and stores sample biometric data associated with the user of the first computing device. The second computing device automatically receives and transmits messages with the first computing device. The first computing device receives, from the host computing device, an authentication request message for authenticating the user of the first computing device, processes the authentication request message, and transmits a biometric request message to the second computing device in response to receiving the authentication request message. The first computing device also receives captured biometric data from the second computing device, electronically compares the captured biometric data to the sample biometric data, and transmits an authentication response message to the host computing device based upon the comparison of the captured biometric data to the sample biometric data. The captured biometric data is captured by the second computing device. The authentication response message indicates whether the captured biometric data matched the sample biometric data.

In another aspect, a method of authenticating a user of a first remote computing device is provided. The method is at least partially implemented by the first remote computing device. The first remote computing device includes a first processor and a first memory. The first memory stores sample biometric data associated with the user of the first computing device. The method includes receiving, from a host computing device, an authentication request message for authenticating the user, processing the authentication request message, and transmitting a biometric request message to a second remote computing device associated with the user in response to receiving the authentication request message. The method further includes receiving captured biometric data from the second remote computing device electronically comparing the captured biometric data to the sample biometric data stored within the first memory, and transmitting, by the first remote computing device, an authentication response message to the host computing device based upon the comparison of the captured biometric data to the sample biometric data. The captured biometric data is captured by the second remote computing device. The authentication response message indicates whether the captured biometric data matched the sample biometric data.

In yet another aspect, computer-readable storage media for authenticating a user of a first remote computing device is provided. The computer-readable storage media has computer-executable instructions embodied thereon. When executed by at least one processor of the first remote computing device, the computer-executable instructions cause the processor to receive, from a host computing device, an authentication request message for authenticating the user, process the authentication request message, and transmit a biometric request message to a second remote computing device paired with the first remote computing device in response to receiving the authentication request message. The computer-executable instructions further cause the processor to receive captured biometric data from the second remote computing device, electronically compare the captured biometric data to sample biometric data stored with a memory associated with the first remote computing device, and transmit an authentication response message to the host computing device based upon the comparison of the captured biometric data to the sample biometric data. The captured biometric data is captured by the second remote computing device. The authentication response message indicates whether the captured biometric data matched the sample biometric data.

In a further aspect, a host computing device for authenticating a user of a first remote computing device is provided. The first remote computing device communicates with the host computing device and with a second remote computing device. The host computing device includes a processor and a memory for storing sample biometric data associated with the user. The processor processes an electronic message requiring authentication of a user of the first remote computing device and transmitting an authentication request message to the first remote computing device to authenticate the user as an authentic user. The first remote computing device transmits the electronic message to the host computing device. The first remote computing device pairs with the second remote computing device, transmits a biometric request message to the second computing device in response to receiving the authentication request message, receives captured biometric data from the second remote computing device that is captured by the second computing device, and (iv) communicates the captured biometric data to the host computing device. The processor further electronically compares the captured biometric data to the sample biometric data stored with the memory and authenticates the user as the authentic user of the first remote computing device if the captured biometric data matches the sample biometric data.

BRIEF DESCRIPTION OF THE DRAWINGS

FIG. 1 is a schematic diagram illustrating an example multi-party payment card processing system with an authentication system for enabling authentication of a user of a first computing device used to initiate an online payment card transaction by pairing the first computing device with a second computing device associated with the same user.

FIG. 2 is a system diagram of the payment card processing system with an authentication system for authenticating a user of a first computing device by using authentication information inputted by the user through a second computing device paired with the first computing device, in accordance with one embodiment of the present disclosure.

FIG. 3 illustrates an example configuration of a computing device shown in the system diagram of FIG. 2.

FIG. 4 is a flowchart of an example method for authenticating a user of a first computing device, performed by using authentication information inputted by the user through a second computing device paired with the first computing device, in accordance with one embodiment of the present disclosure.

FIG. 5 is a diagram of components of one or more example computing devices that may be used in embodiments of the system shown in FIG. 2 and the method shown in FIG. 4.

FIG. 6 is a data flow diagram illustrating an embodiment of example messaging within the authentication system shown in FIG. 2, including a host computing device, a first computing device, and a second computing device paired with the first computing device, in accordance with one embodiment of the present disclosure.

FIG. 7 is a data flow diagram illustrating an alternative embodiment of example messaging within the authentication system shown in FIG. 2, including a host computing device, a first computing device, and a second computing device paired with the first computing device, in accordance with one embodiment of the present disclosure.

DETAILED DESCRIPTION

Figure 1:
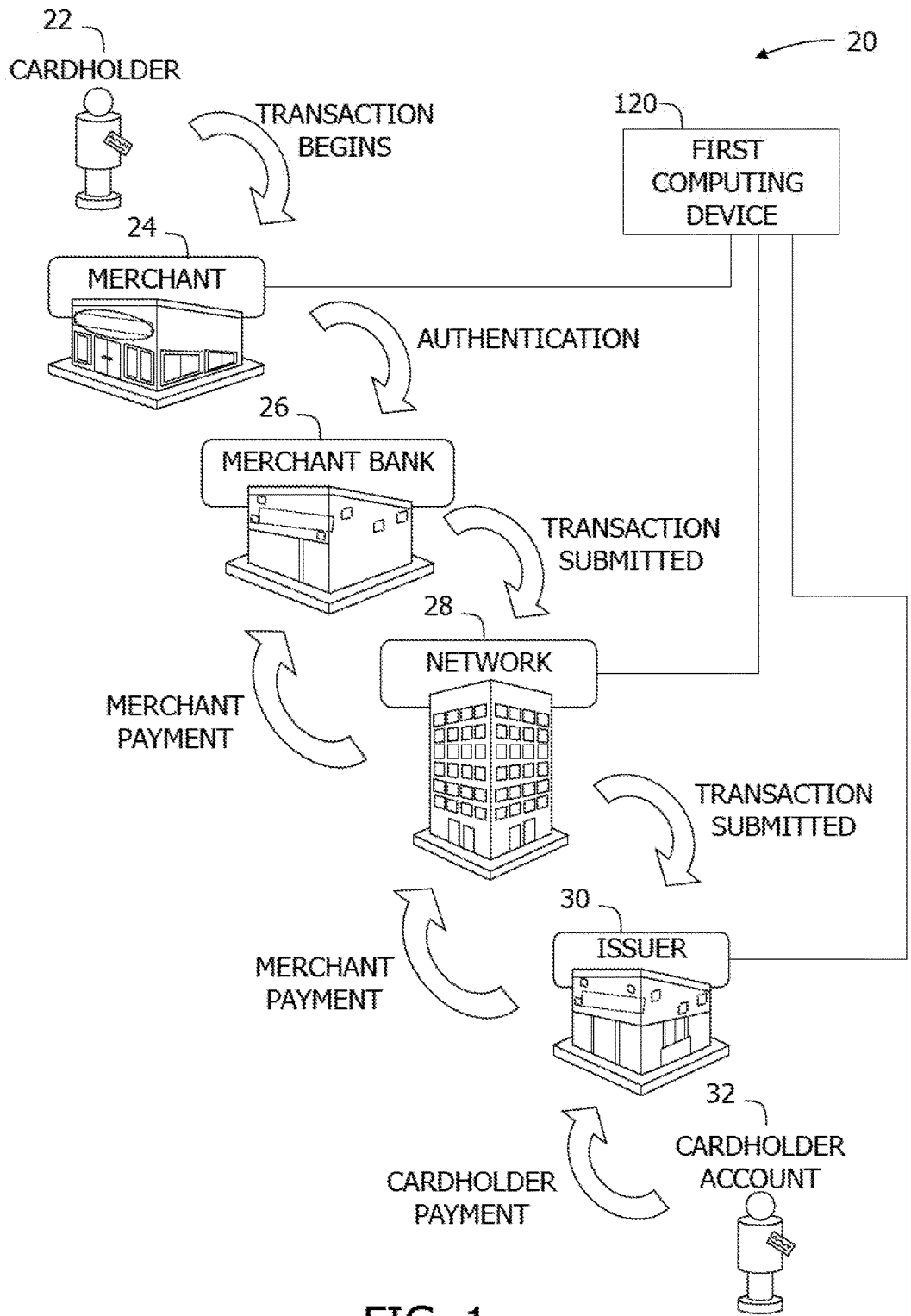
FIGS. 1-7 show example embodiments of the methods and systems described herein.

Described herein is a system and method for authenticating a user of a first computing device during a "card-not-present" transaction by using authentication information inputted by the user through a second computing device that is paired with the first computing device. The authentication system includes a host computing device, a first remote computing device, and a second remote computing device. The host computing device is configured to (i) receive and process transaction data associated with a payment transaction, where the transaction is initiated using a payment account of a user of the first computing device in a "card-not-present" transaction, (ii) detect the payment account is enrolled in an authentication service, and (iii) transmit a authentication request message to the first computing device for authenticating the user of the first computing device. The first computing device is configured to (i) receive the authentication message from the host device, and (ii) transmit a biometric request message to the second computing device that is associated or paired with the first computing device. The second computing device is configured to (i) receive the biometric request message, (ii) prompt a user to input authentication data, (iii) capture the authentication data inputted by the user, and (iv) transmit the captured authentication data to the first computing device, where the first computing device is configured to authenticate the user (i.e., the cardholder) based on the captured authentication information and previously stored sample authentication data. As used herein, authentication refers to verifying that the party initiating the purchase is, in fact, the actual cardholder authorized to make the purchase on the cardholder account. For example, the authentication system is useful in identifying whether a particular transaction is fraudulent or not. Accordingly, methods and systems, such as those provided herein, of authenticating a cardholder are desirable.

As described herein, in one example, a cardholder may register for an authentication service through a bank which issued a payment card to the cardholder. In one embodiment, the host computing device prompts the cardholder to enroll in the authentication service. During the registration process, the cardholder provides the issuing bank with authentication data, such as sample biometric data and/or other types of authentication data. For example, the sample biometric data may include a photo of their face/head, a fingerprint, and the like. The cardholder also provides a device ID corresponding to a user device (sometimes referred to herein as a remote computing device) associated with the cardholder. Accordingly, the cardholder's user device is registered as first computing device 120 (shown in FIG. 2). In at least some embodiments, the cardholder provides an account identifier for identifying a payment account associated with the device ID and stored authentication data.

Subsequently, the cardholder attempts to make a purchase through an online merchant. During checkout, the cardholder is asked to input their payment card or account information. Accordingly, the cardholder enters payment account information for the account associated with the authentication service. The online merchant forwards initial transaction information to the host computing device, which in the example embodiment is a payment processor for transaction processing. In response, the host computing device determines that the payment account is enrolled in the authentication service. For example, the host computing device may identify the account identifier within the transaction information and perform a lookup in a memory of the host computing device to determine if the payment account is enrolled in the authentication service. Based on cardholder information acquired during the enrollment process (i.e., the device ID), the host computing device issues an authentication request message to the user device of the cardholder (i.e., the first computing device).

In response to receiving the authentication request message, the first computing device broadcasts a request message to one or more computing device (i.e., the second computing device) paired with the first computing device and within a predetermined range or radius of the first computing device. The second computing device may be any computing device configured to capture authentication data and perform bi-directional communication with the first computing device. For example, a remote control from a smart TV, a smart watch, a smartphone, a tablet, or any other computing device may be available as a second computing device that may be used for authentication. In the example embodiment, the first computing device transmits a biometric request message to one or more paired devices. In some embodiments, the first computing device may be configured to determine a type or method of authentication requested by the authentication request message and detect which (if any) paired devices are configured to capture the requested authentication information. For example, if a paired device includes a fingerprint scanner but does not include a camera, the paired device is configured to capture fingerprint data but is not configured to capture image data.

Pairing includes a process of authenticating two devices to ensure that wireless communication and security is established between the two devices. Devices that have been paired automatically recognize each other and connect, disconnect, and the like, with ease. By pairing, devices are connected to each other and/or networks via different wireless protocols, for example, Bluetooth, WiFi, near field communication (NFC), and the like. In another embodiment, pairing is also performed through a cloud server, the Internet, and the like. The first computing device and the second computing device each include a transmitter and a receiver for bi-directional, automatic data communication between each other when paired. In some embodiments, the data communication between the first and second computing devices may be encrypted.

Examples of devices that may be paired with each other include smartphones, tablets, phablets, smartwatches, smartbands, smartglasses, keyboards, printers, smart televisions, remote controllers, laundry machines, refrigerators, dishwashers, and the like. The second computing device may include one or more of a display such as a touch screen, a camera, a microphone, a sensor, and the like, which may be used by a cardholder to input authentication information, for example, a fingerprint, a photo, a heartbeat, a pulse, a code word or password, a personal identification number (PIN), and any other indicator that can be used to identify a person.

A device may pair with a plurality of other devices even if the other devices are manufactured by a different company. Also, even though certain examples herein refer to specific types of devices, it should be appreciated that the examples are not limited thereto and may include any device capable of pairing with another device.

In the example embodiment, the cardholder provides the requested authentication data through the second computing device. For example, the cardholder may provide biometric data (e.g., take a picture of their face, fingerprint, iris scan, etc.) using a camera of the remote control or the smart watch. In another example, the cardholder may enter a personal identification number (PIN) using a keypad of the remote control or the smart watch. The second computing device transmits the captured authentication data (e.g., the image or the PIN) to the first computing device of the cardholder, which compares the captured authentication data to sample authentication data stored by the first computing device. If the captured authentication data and the sample authentication data substantially match, the first computing device may determine that the authentic cardholder has initiated the payment transaction using the cardholder's payment account. In certain embodiments, the first computing device may transmit the sample authentication data to the second computing device to enable the second computing device to compare the sample authentication data to the captured authentication data. The second computing device may notify the first computing device of the result of the comparison and whether or not the cardholder is authenticated. In some embodiments, if a difference between the captured authentication data and the sample authentication data is within a predefined threshold, the cardholder may be authenticated.

In the example embodiment, the first computing device transmits an authentication response message to the host computing device indicating whether the compared authentication data matched and/or a result of the authentication process. The host computing device is configured to authorize the payment transaction based on the authentication response message and process the payment transaction. Additionally or alternatively, the host computing device may transmit the authentication response message to an issuer associated with the payment account for authorization of the payment transaction.

In another example, after the second computing device captures the authentication data, the first user computing device may be configured to transmit the captured authentication data to the host computing device. The host computing device is configured to compare the captured authentication data to the sample authentication data stored with the authentication profile of the user. If the sample authentication data substantially matches the captured authentication data, the host computing device may authenticate the user and notify the issuer or other party that the user has been authenticated.

The methods and systems described herein may be implemented using computer programming or engineering techniques including computer software, firmware, hardware or any combination or subset thereof, wherein the technical effects may be achieved by performing one of the following steps: (a) receiving, from a host computing device, an authentication request message for authenticating a user of a first computing device; (b) processing the authentication request message; (c) transmitting a biometric request message to a second computing device in response to receiving the authentication request message; (d) receiving captured biometric data from the second computing device, the captured biometric data being captured by the second computing device; (e) electronically compare the captured biometric data to the sample biometric data stored with the first memory; and (f) transmitting an authentication response message to the host computing device based upon the comparison of the captured biometric data to the sample biometric data, the authentication response message indicating whether the captured biometric data matched the sample biometric data.

The technical benefits achieved by the methods and systems described herein include: (a) reducing the number of fraudulent transactions transmitted and/or processed in a payment network; (b) increasing bandwidth of the payment network due to less fraudulent transactions being processed; and (c) increasing a speed and an efficiency of the payment network due to less fraudulent transactions being processed.

Described herein are computer systems such as a host computing device, a first computing device, a second computing device, a merchant device, an issuer device, and related systems. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium.

In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. For example, the operating system may include any operating system capable of supporting device authentication, as described herein, including, but not limited to, iOS, Android, Symbian, etc. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticating a cardholder for an online payment card transaction.

FIG. 1 is a schematic diagram illustrating an example multi-party payment card system 20 for authenticating a user of a first computing device by using authentication information of the user input by the user through a second computing device paired with the first computing device in an online payment card transaction. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

For online transactions, an authentication process may also be performed to verify that cardholder 22 is physically present when making an online purchase with cardholder's account 32. In the embodiments described herein, a first computing device 120 (shown in FIG. 2) operated by cardholder 22 facilitates performing an authentication using authentication information of the cardholder input by the cardholder through a second computing device for online transactions processed using payment card system 20. To facilitate authentication, first computing device 120 is in communication with merchant 24, payment network 28, and issuer 30, as described herein.

Figure 2:
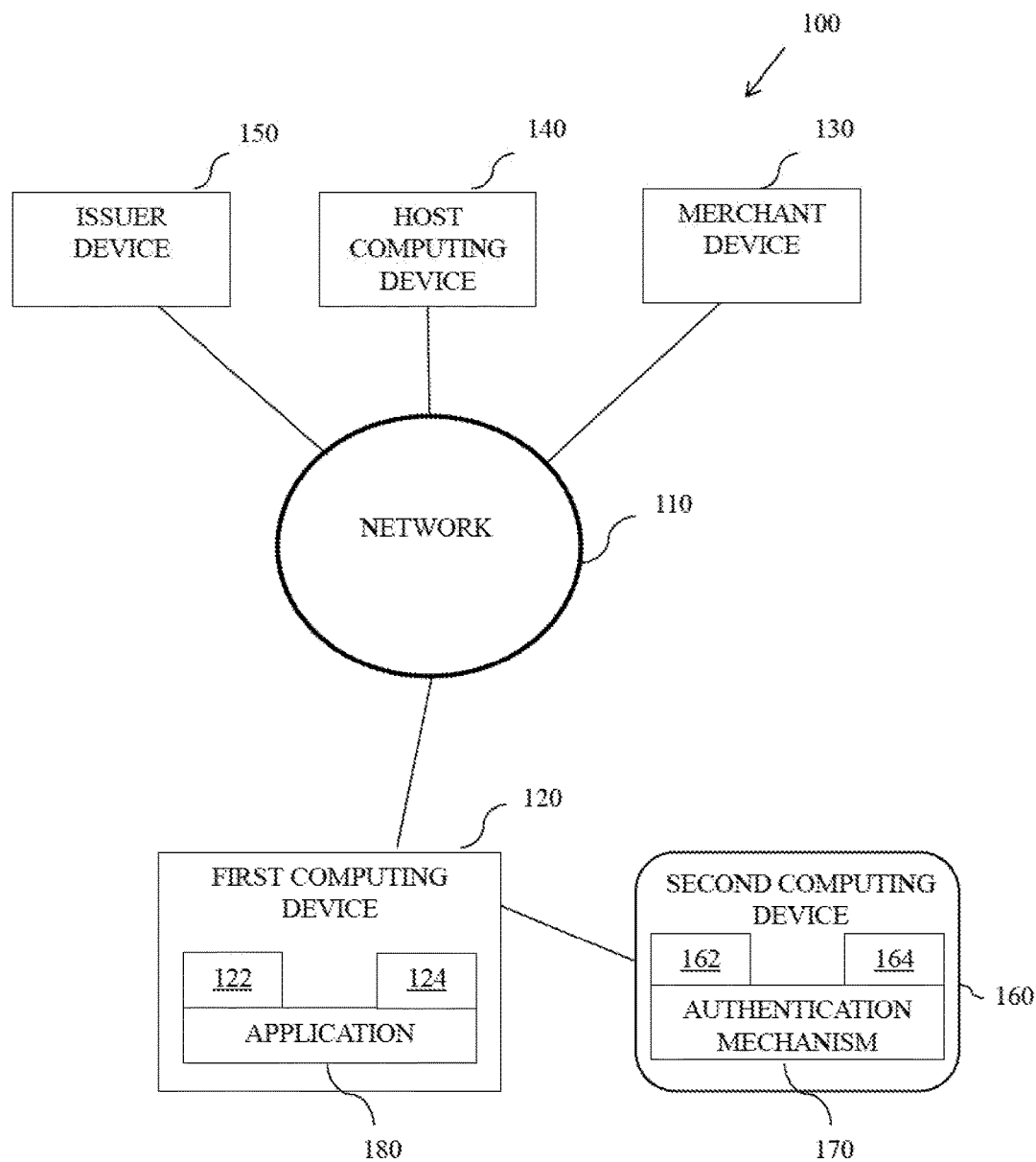

FIG. 2 is a diagram illustrating an example of an authentication system 100 that may be used, for example, in payment card system 20 (shown in FIG. 1). Authentication system 100 includes a plurality of computing devices that are connected to each other via a network 110. Network 110 may include the Internet, a local network, a home network, a combination of networks, and the like. The computing devices include first computing device 120, a merchant device 130 operated by a merchant, such as merchant 24 (shown in FIG. 1), a host computing device (i.e., a payment processor) 140, an issuer device 150 operated by an issuing bank, such as issuer 30 (shown in FIG. 1), and a second computing device 160 that is paired with first computing device 120. In some embodiments, second computing device 160 includes a biometric mechanism 170 configured to receive biometric authentication information (i.e., a fingerprint scanner, a camera, etc.).

In this example, first computing device 120 refers to a computing device of a cardholder, for example, a smartphone, a tablet, a phablet, a notebook, a smartwatch, and the like. A cardholder, such as cardholder 22 (shown in FIG. 1) may access merchant device 130, or an online site associated with merchant device 130, and purchase an item from merchant device 130 using a payment card account, such as cardholder account 32 (shown in FIG. 1). For example, the cardholder may use first computing device 120 in order to make the online purchase. In another embodiment, cardholder may use another computing device (not shown) to make an online purchase from merchant device 130, for example, a laptop computer, a desktop computer, a mobile device, and the like. The purchase may be referred to as a card-not-present (CNP) purchase because the transaction is not performed face-to-face but is instead performed online through network 110. In other words, merchant device 130 is not able to physically inspect a payment card of the cardholder nor is the payment card capable of being swiped through a point of sale device of the merchant device 130.

First computing device 120 is paired with one or more second computing devices that are located within a predetermined radius of first computing device 120. In this example, second computing device 160 is paired with first computing device 120 through a wireless protocol, for example, Bluetooth, WiFi, NFC, and the like. In the example embodiment, first computing device 120 includes a transmitter 122 and a receiver 124. Second computing device 160 includes a transmitter 162 and a receiver 164. First and second computing devices 120, 160 are paired together by communicatively coupling transmitter 122 to receiver 164 and receiver 124 to transmitter 162 to facilitate bi-directional, automatic data communication. As a non-exhaustive example only, second computing device 160 may include a smart TV, a remote controller, a printer, a smartwatch, a tablet, a smartband, a pair of smartglasses, a keyboard, a laundry machine (e.g., washer or dryer), a refrigerator, a dishwasher, and the like. In at least some embodiments, first computing device 120 may be limited to pairing to second computing device 160 within a predetermined radius or zone, for example, within a Bluetooth communication radius, and the like. The predetermined radius may be from first computing device 120 or a wireless access point (not shown) in communication with first computing device 120. For example, the predetermined radius may originate from a wireless router providing a Wifi network.

Merchant device 130, host computing device 140, and issuer device 150 are also connected to network 110. In this example, issuing bank refers to a bank that issued a payment card to the cardholder and is associated with issuer device 150. At the time of issuing the payment card, or at a later time, the cardholder is prompted to enroll the payment card account in an authentication service. For example, the payment card account may be registered for the authentication service through at least one of issuer device 150, host computing device 140, and merchant device 130. For convenience, in this example, the payment card account is registered for paired authentication through issuer device 150. During an enrollment process for the authentication service, the cardholder may provide issuer device 150 with sample authentication data of the cardholder (e.g., a photo, fingerprint, a code word, etc.) and information (e.g., a device ID) about first computing device 120. In some embodiments, the cardholder may also provide an account identifier to identify a payment account of the cardholder to be enrolled in the authentication service.

In response, issuer device 150 transmits, pushes, or otherwise sends an authentication application 180 such as a mobile application to first computing device 120. In the example embodiment, application 180 is operating system specific, such that computing devices with different operating systems will receive application 180 in different formats. First computing device 120 downloads, installs and/or executes application 180 using a processing device thereof. Also, issuer device 150 informs host computing device 140 that the account of the cardholder has been registered for paired authentication. In another embodiment, the cardholder registers for the authentication service with the host computing device 140, the merchant device 130, and the like. In at least some embodiments, host computing device 140 stores the data provided by the cardholder (i.e., the sample authentication data, the account identifier, etc.) in an authentication profile of the cardholder in a memory associated with host computing device 140.

When the payment account is used to initiate an online payment transaction using the registered payment account, system 100 is configured to perform authentication of the cardholder using the enrolled first computing device 120. For example, the cardholder uses a computing device such as first computing device 120 or another computing device to make an online purchase for an item sold by merchant device 130. Here, because the transaction occurs online or over the phone, the transaction is referred to as a CNP transaction. Using the computing device, the cardholder authorizes payment of the item using the payment card registered for paired authentication.

At this point, during the authorization of the payment transaction, merchant device 130, host computing device 140, or issuer device 150 detects that the payment account of the cardholder is enrolled in paired authentication and issues an authentication request message to first computing device 120 for authentication. As a non-limiting example, merchant device 130 receives the cardholder's information and transmits transaction information to the host computing device 140 through network 110 to authorize the transaction. The transaction information includes an identification of the cardholder, the account identifier (e.g., payment account number), a purchase price, a time and day, and the like. In response to receiving the transaction information from merchant device 130, host computing device 140 detects that the cardholder is enrolled in the authentication service. For example, host computing device 140 may be configured to perform a lookup in the memory associated with host computing device 140 for a stored authentication profile corresponding to the transaction information. Accordingly, host computing device 140 initiates an authentication process of the cardholder in response to the initiated payment transaction with the registered payment account.

In response to determining that the payment card of the cardholder is enrolled in the authentication service, host computing device 140 issues an authentication request message to first computing device 120 that was previously enrolled by the cardholder. For example, host computing device 140 identifies first computing device 120 and transmits an authentication request message to first computing device 120 based on the device ID associated with first computing device 120, which is provided during the enrollment process. The authentication request message is configured to identify the type of expected authentication response (i.e., a fingerprint, a selfie, or a PIN).

According to various examples described herein, first computing device 120 acts as a relay device that is configured to receive and process the authentication request message. In response to the authentication request message, first computing device 120 is configured to identify a paired device or potentially pair-able device within a predetermined radius that is configured to capture or collect the requested authentication data. In the example embodiment, first computing device 120 transmits a request message, such as a biometric request message, to second computing device 160 that is paired to first computing device 120. Although referred to herein as a biometric request message, it is to be understood that other types of authentication data may be requested and captured for authenticating the user. First computing device 120 is configured to identify what types of authentication data the paired devices are configured to capture. For example, if a selfie is requested, first computing device 120 transmits the biometric request message to second computing device 160 if second computing device 160 has a camera. If more than one second computing devices 160 are available to perform authentication, first computing device 120 may selectively transmit the biometric request message to each second computing device 160. First computing device 120 may be configured to sequentially transmit the biometric request message to each second computing device 160 until an available second computing device 160 capable of performing authentication is found.

In response to receiving the biometric request message, second computing device 160 may transmit a response to first computing device 120 indicating that the device is available or is not available for performing authentication. In another embodiment, if second computing device 160 is capable of performing information, second computing device 160 waits until receiving an input from cardholder. Accordingly, a cardholder inputs authentication data into input mechanism 170 of second computing device 160. In one embodiment, input mechanism 170 is a camera configured to capture an image of the cardholder or a portion of the cardholder. For example, the image may be of a face of a cardholder, a fingerprint of a cardholder, and the like. In another embodiment, input mechanism 170 is a fingerprint scanner, a retina scanner, and/or iris scanner configured to capture biometric data. In still another embodiment, input mechanism 170 is a keyboard to enter a personal identification number. In yet another embodiment, input mechanism 170 is a sensor configured to sense a pulse, heart rate, blood pressure, and the like, of the cardholder. It should also be appreciated that second computing device 160 may include any sensor or other data capturing element for capturing verification of the cardholder. For example, the verification may be biometric verification based on a cardholder input including hand geometry, earlobe geometry, retina patterns, iris patterns, voice waves, keystroke dynamics, DNA, signatures, and the like. In another example, the verification may be an alphabetic or numeric verification.

In response to capturing the authentication data from the cardholder, second computing device 160 transmits the captured authentication data to first computing device 120. First computing device 120 authenticates the cardholder based, at least in part, on the captured authentication data from the cardholder. Here, first computing device 120 has previously stored therein authentication data of the cardholder, for example, the sample biometric data provided by cardholder to the issuer device 150 during enrollment. The issuer device 150 may store the authentication data and push the authentication data to first computing device 120 through the application. First computing device 120 compares the captured authentication data to the sample authentication data to determine whether or not the authentication of the cardholder is successful. In one example, if the captured authentication data and the sample authentication data substantially match, the cardholder is authenticated. In another example, if a difference between the captured authentication data and the sample authentication data is within a predefined threshold, the user may be authenticated. In certain embodiments, first computing device 120 may be configured to transmit the sample authentication data to second computing device 160 to enable second computing device 160 to perform the comparison of the captured and sample authentication data. Second computing device 160 may notify first computing device of a result of the comparison and whether or not the cardholder's identity has been authenticated. In the example embodiment, after determining whether or not the cardholder is authenticated, first computing device 120 transmits an authentication response message to host computing device 140 or another computing device indicating whether or not the captured biometric data substantially matched the sample biometric data (i.e., whether or not the authentication was successful).

In another embodiment, first computing device 120 transmits the captured authentication data to host computing device 140 where the captured authentication data of the cardholder is compared to stored sample authentication data to determine if the cardholder is authenticated. In another embodiment, host computing device 140 transmits the captured authentication data to issuer device 150 where the authentication input is authenticated.

After performing a successful authentication of the cardholder, the transaction may be authorized by issuer device 150, host computing device 140, and merchant device 130. In some embodiments, host computing device 140 transmits the authentication response message to issuer device 150 and/or merchant device 130 for authorization. Here, the transaction is processed and enters a transaction lifecycle including authorization, clearing, and settlement processes. However, if the authentication is unsuccessful, the transaction may be declined by one of issuer device 150, host computing device 140, and merchant device 130. In other words, the authorization of the transaction may be declined. Accordingly, the transaction may not enter the transaction lifecycle and may be ended.

It should be appreciated that although the authentication request message is detected and issued by host computing device 140, another device, for example, merchant device 130, issuer device 150, a third-party device, and the like, may instead detect and issue the request message. Accordingly, the examples herein are not limited to the host computing device 140 issuing the request message. For example, cardholder may register for paired authentication with merchant device 130, a bank that issued a credit card for the merchant device 130, and the like.

Figure 3:
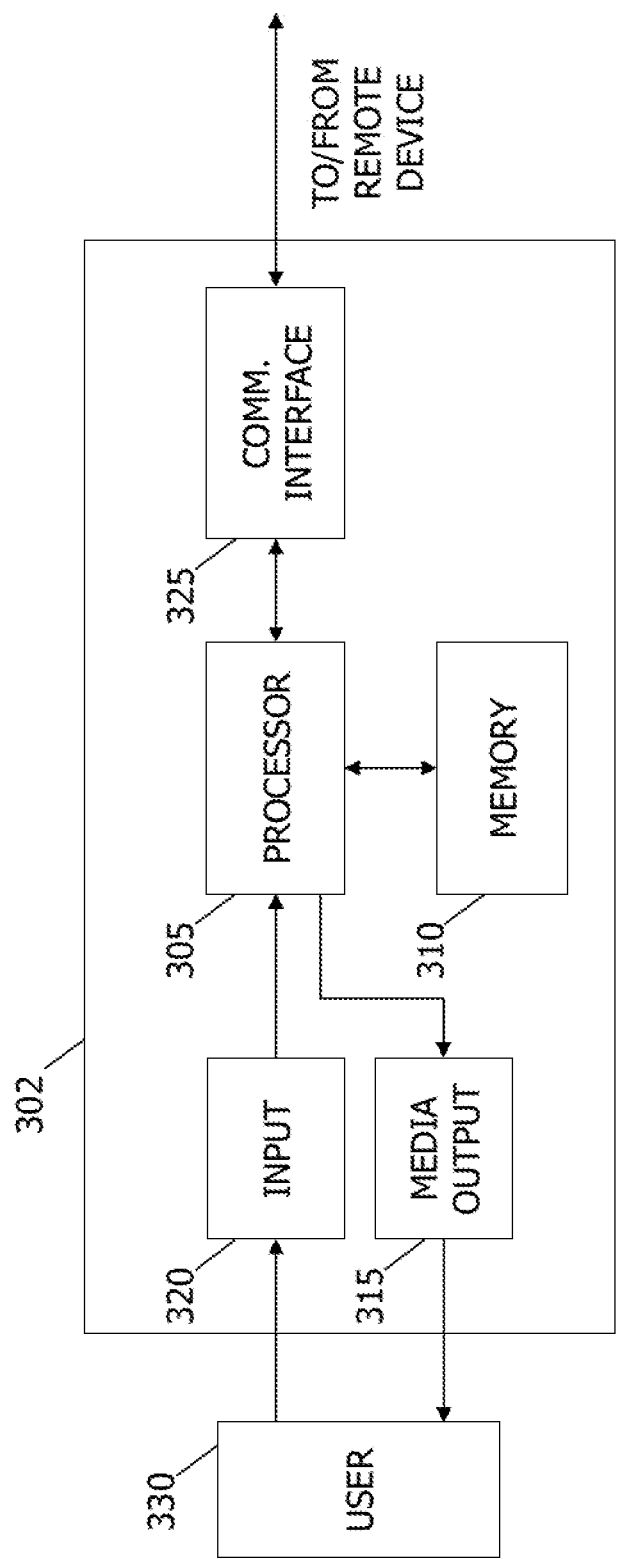

FIG. 3 depicts an example configuration of a computing device 302, such as first computing device 120 and second computing device 160. Computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer-readable media. For example, biometric information may be stored in memory area 310.

Computing device 302 also includes at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 includes an input device 320 for receiving input from user 330. Input device 320 may include, for example, a keyboard, a pointing device, a mouse, a stylus, a touch sensitive panel (e.g., a touch pad or a touch screen), a camera, a fingerprint scanner, a retina scanner, a gyroscope, an accelerometer, a position detector, and/or an audio input device. A single component such as a touch screen may function as both an output device of media output component 315 and input device 320.

Computing device 302 also includes a communication interface 325, which is communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
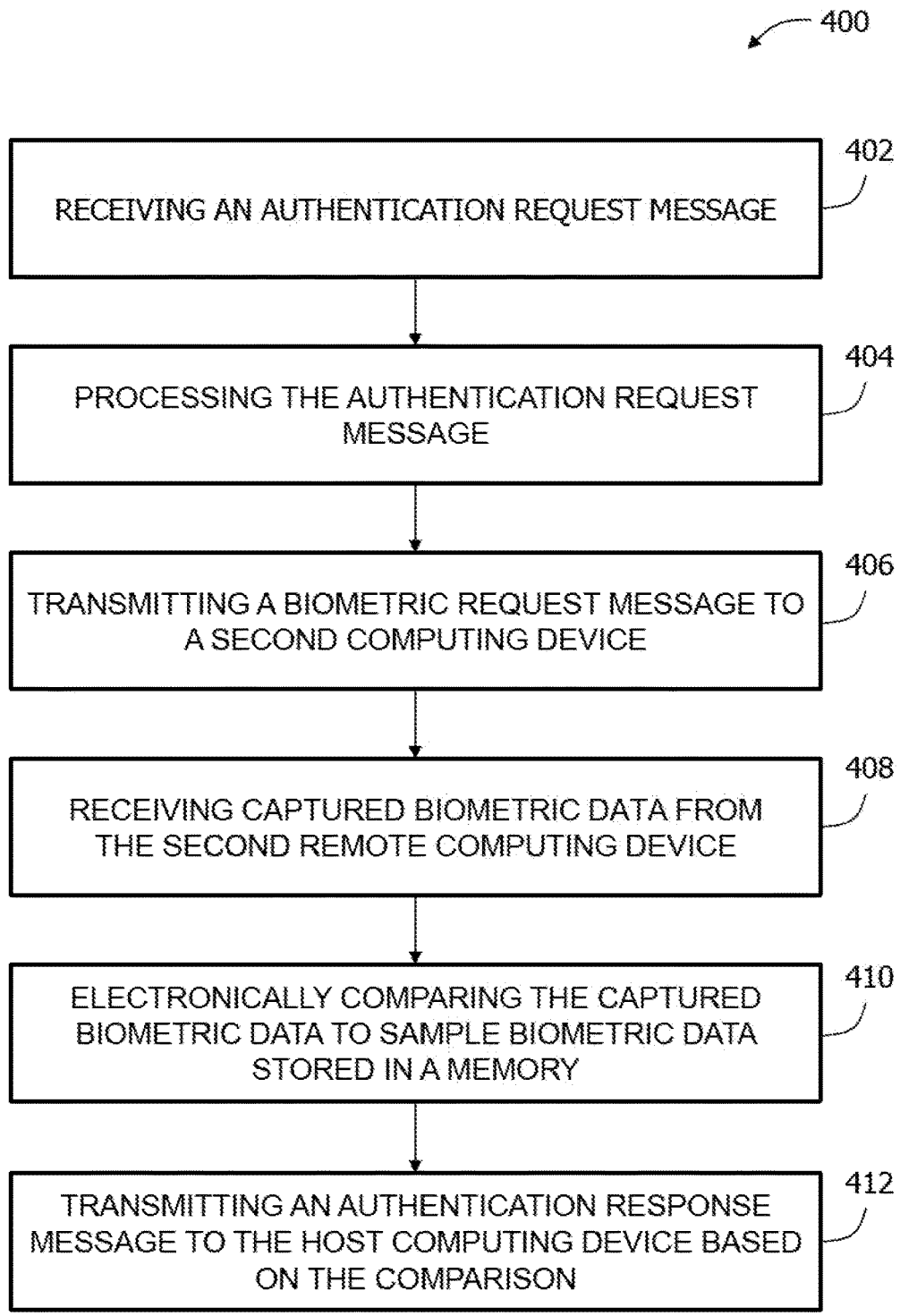

FIG. 4 is a flowchart of an example method 400 for authenticating a cardholder using paired devices within system 100 (shown in FIG. 2). In the example embodiment, method 400 is performed by a first computing device (e.g., first computing device 120, shown in FIG. 2). It is to be understood that at least a portion method 400 may be performed by a host computing device, issuer device, or merchant device. In some embodiments, method 400 may include additional, fewer, or alternative steps, including those described elsewhere herein.

Method 400 begins with the first computing device receiving 402 an authentication request message from the host computing device to authenticate the cardholder for a payment transaction using a payment account associated with the user. The first computing device processes 404 the authentication request message to determine information about the payment transaction and identify a type of authentication data requested (e.g., fingerprint, image, PIN, etc.). In some embodiments, the first computing device detects if any paired devices or second remote computing devices within a predetermined radius of the first computing device are configured to capture the requested authentication data. In the example embodiment, the authentication request message is requesting biometric data.

The first computing device transmits 406 a biometric request message to a second remote computing device that is within a predetermined radius of the first computing device and is configured to capture the biometric data. The second remote computing device prompts the cardholder to input the biometric data. Once the biometric data is captured by the second remote computing device, the first computing device receives 408 the captured biometric data from the second remote computing device. The first computing device electronically compares 410 the captured biometric data to sample biometric data stored by the first computing device. Based on the comparison, the first computing device determines whether the captured biometric data is associated with the authentic cardholder (i.e., authentication is successful). In particular, if the captured biometric data substantially matches the sample biometric data, the cardholder may be authenticated. In some embodiments, the first computing device may transmit the captured biometric data and/or the sample biometric data to the host computing device to facilitate the host computing device performing the comparison and determination. The first computing device transmits 412 an authentication response message to the host computing device indicating whether the captured biometric data substantially matched the sample biometric data. In at least some embodiments, the authentication response message is used to authenticate the cardholder and subsequently authorize the payment transaction.

Figure 5:
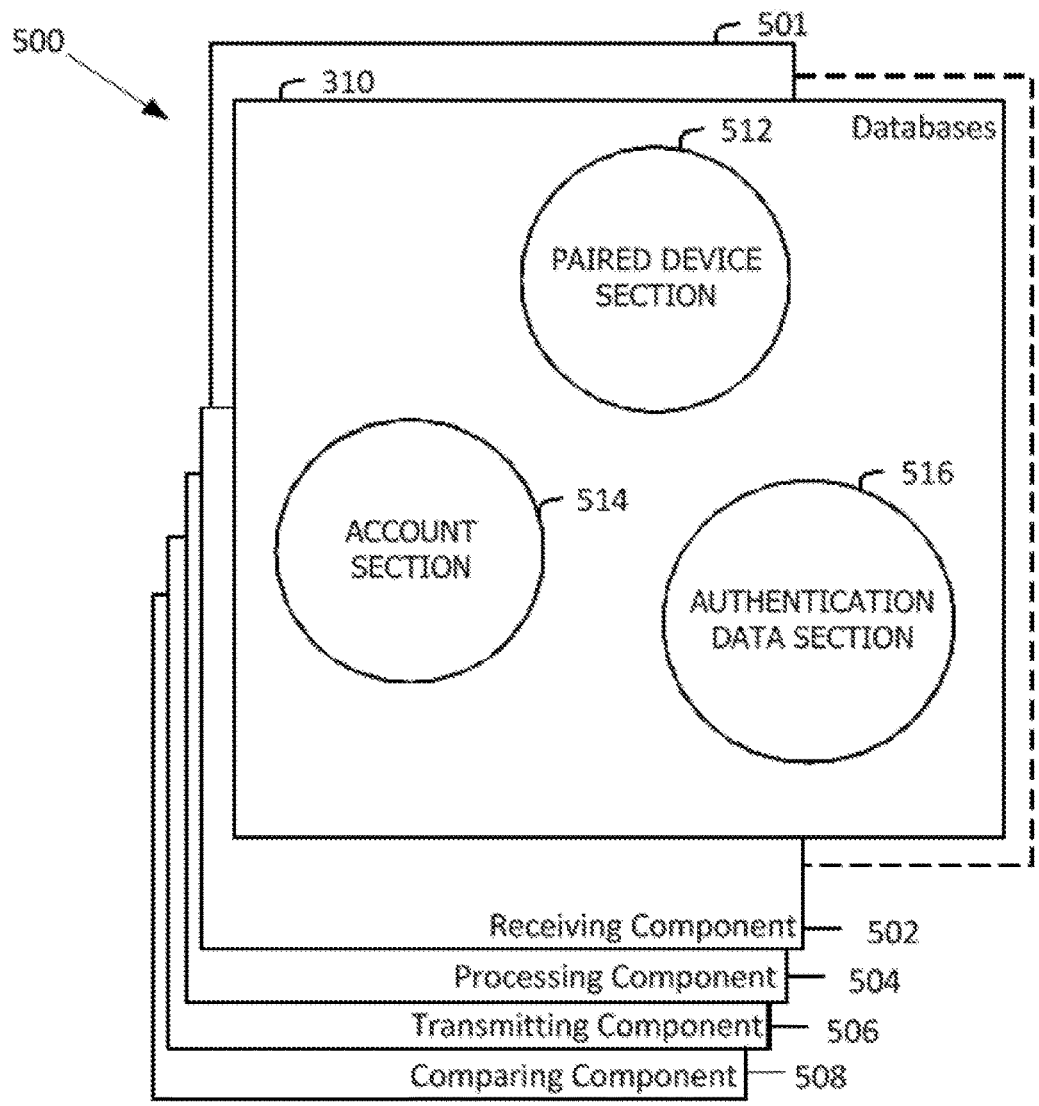

FIG. 5 is a diagram 500 of components of one or more example computing devices that may be used in method 400 shown in FIG. 4. FIG. 5 further shows a configuration of databases including at least memory area 310 (shown in FIG. 3). Memory area 310 is coupled to several separate components within a computing device 501, which perform specific tasks.

Computing device 501 includes a receiving component 502 configured to receive an authentication request message for authenticating a user and receive captured biometric data from a second computing device. Computing device 501 further includes a processing component 504 configured to process the authentication request message. Additionally, computing device 501 includes a transmitting component 506 configured to transmit a biometric request to the second computing device and transmit an authentication response message. Computing device 501 further includes a comparing component 508 configured to electronically compare he captured biometric data to the sample biometric data stored within memory area 310.

In an example embodiment, memory area 310 is divided into a plurality of sections, including but not limited to, paired device section 512, an account section 514, and an authentication data section 516. These sections within memory area 310 are interconnected to update and retrieve the information as required.

Figure 6:
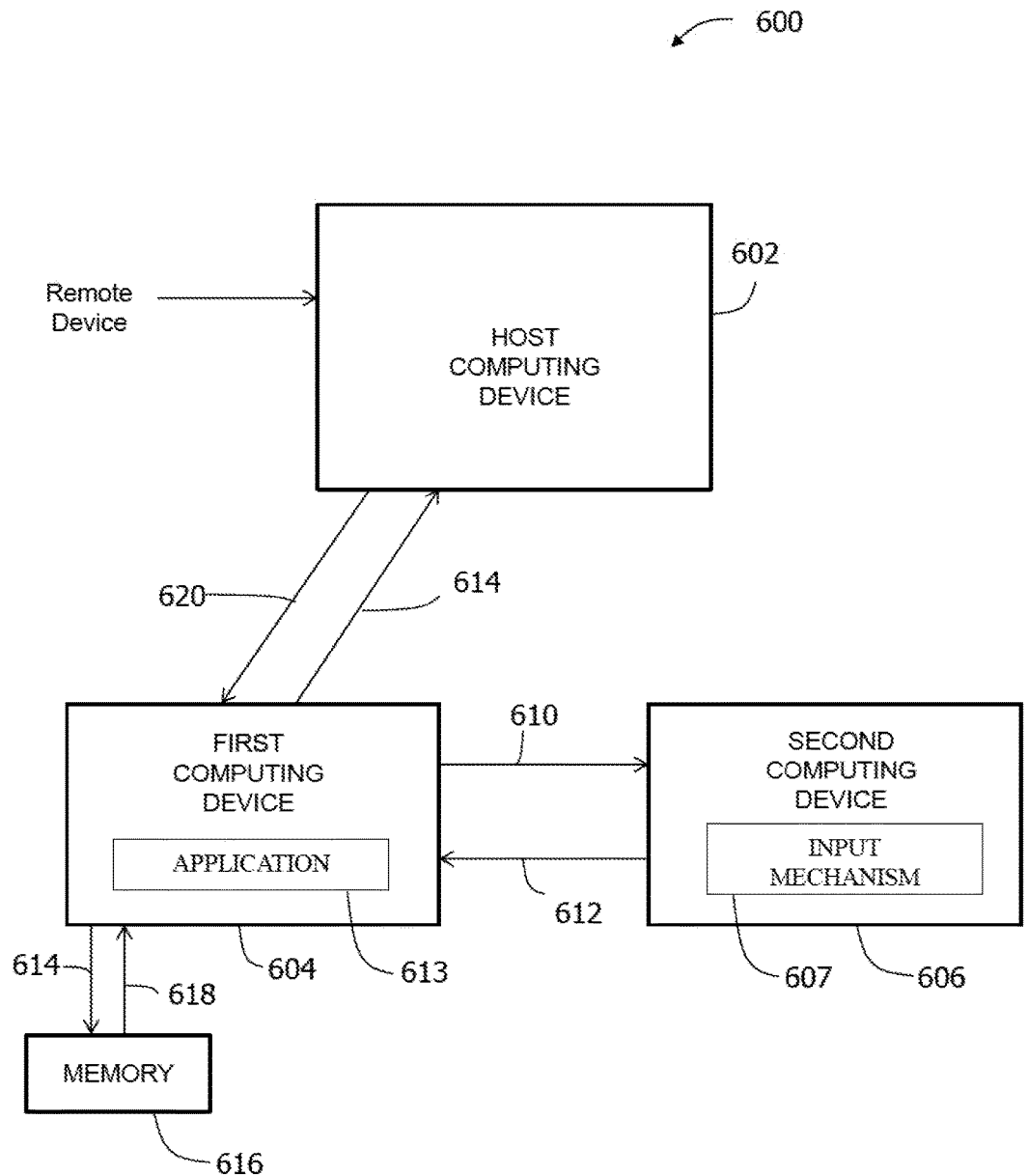

FIG. 6 illustrates an example embodiment of an order of messaging 600 between a host computing device 602 (i.e., a payment processor), a first computing device 604, and a second computing device 606 paired with first computing device 604. In the example embodiment, application 613 is transmitted by host computing device 602 to first computing device 604 and stored in memory 616 of first computing device 604. Host computing device 602 is connected to first computing device 604 via a network, such as the Internet, a local network, a home network, or a combination of networks. Application 613 includes authentication information for a cardholder and is configured to authenticate the cardholder based at least partly on the authentication information. When the cardholder initiates a CNP transaction with a payment card, host computing device 602 is configured to receive initial transaction data from a remote device, such as a merchant device. Host computing device 602 detects that the cardholder is enrolled in an authentication service and transmits 608 an authentication request message to first computing device 604. First computing device 604 is configured to receive the authentication request message and transmit 610 a biometric request message to second computing device 606 that is paired with first computing device 604. First computing device 604 and second computing device 606 are connected to each other and/or networks via different wireless protocols, for example, Bluetooth, WiFi, NFC, and the like.

Second computing device 606 is configured to receive the authentication message, and in response, prompt the cardholder for authentication data captured by input mechanism 607. Second computing device 606 is further configured to transmit 612 the captured authentication data to first computing device 604. In one embodiment, application 613 stored on first computing device 604 is configured to authenticate the cardholder by comparing the authentication data stored in memory 616 with the captured authentication data from second computing device 606. More specifically, first computing device 604 is configured to transmit a message 614 to memory 616 requesting cardholder profile information and in particular, sample authentication data (i.e., fingerprint, self-portrait, PIN, etc.) provided by the cardholder during the registration process described above. In response, memory 616 transmits 618 the cardholder profile information to first computing device 604. First computing device 604 compares the sample authentication data associated to the captured authentication data from second computing device 606 to authenticate the cardholder. First computing device 604 transmits 620 an authentication response message to host computing device 602 whether the cardholder has been authenticated or not.

Figure 7:
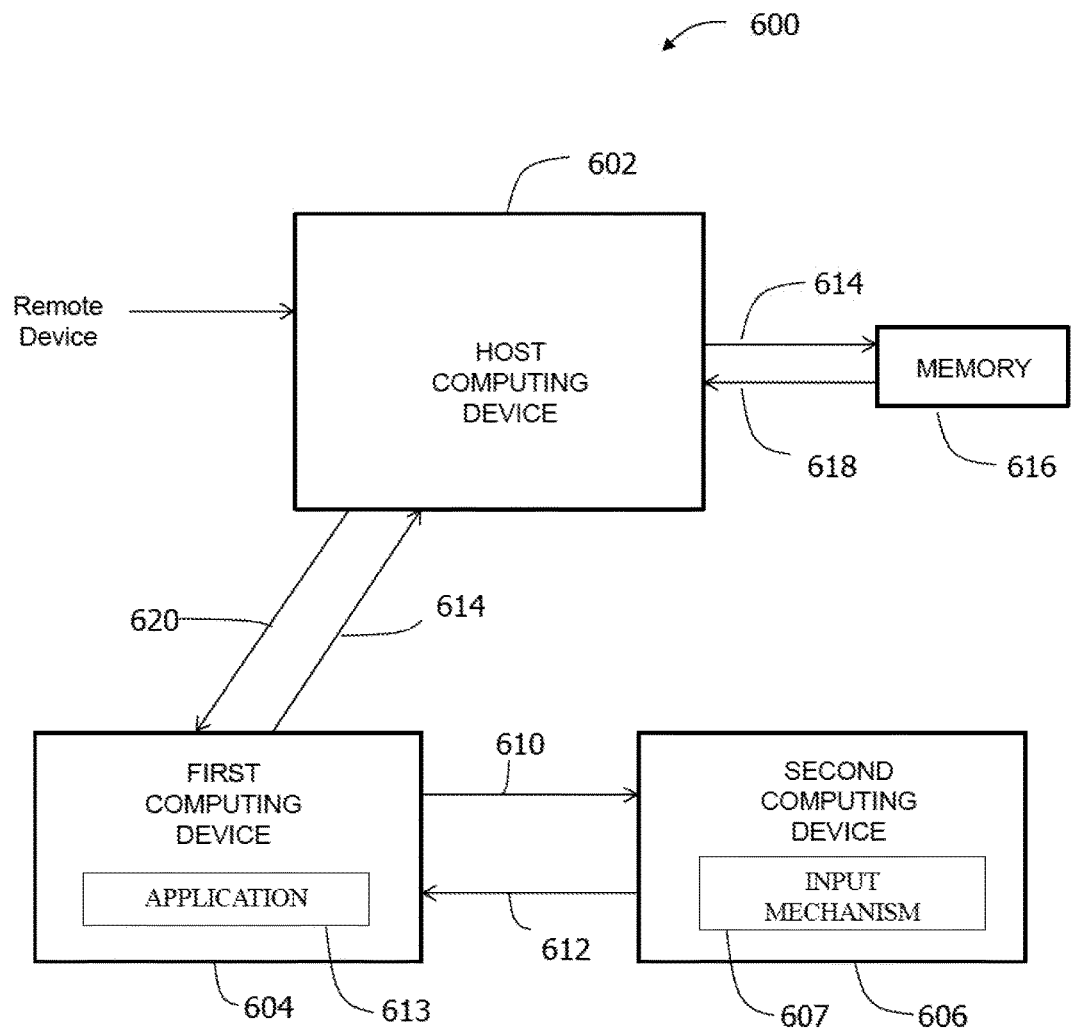

FIG. 7 illustrates an alternative embodiment of an order of messaging 600 between a host computing device 602, a first computing device 604, and a second computing device 606 paired with first computing device 604. Host computing device 602 is connected to first computing device 604 via a network, such as the Internet, a local network, a home network, or a combination of networks. Authentication information is stored in memory 616 of host computing device 602. When a CNP transaction is initiated using a payment account of a cardholder, host computing device 602 is configured to receive initial transaction data from a remote device, such as a merchant device. The host computing device 602 detects that the cardholder is enrolled in an authentication service and transmits 608 an authentication request message to first computing device 604. First computing device 604 is configured to receive the authentication request message and transmit 610 a biometric request message to second computing device 606 that is paired with first computing device 604. First computing device 604 and second computing device 606 are connected to each other and/or networks via different wireless protocols, for example, Bluetooth, WiFi, NFC, and the like.

Second computing device 606 is configured to receive the biometric request message and, in response, capture authentication data provided by the cardholder through input mechanism 607. Second computing device 606 is further configured to transmit 612 the captured authentication data to first computing device 604, where first computing device 604 is configured to forward the authentication information to host computing device 602. Host computing device 602 is configured to transmit a message 614 to memory 616 requesting an authentication profile associated with the cardholder and in particular, sample authentication data (i.e., fingerprint, self-portrait, PIN, etc. of the cardholder) provided by the cardholder during the registration process described above. In response, memory 616 transmits 618 the authentication profile to host computing device 602. Host computing device 602 compares the sample authentication data to the captured authentication data from second computing device 606 to authenticate the cardholder.

In an alternative embodiment, host computing device 602 or first computing device 604 is configured to transmit 614 the authentication information to a third-party computing device where the user is authenticated.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pair of remote computing devices for authenticating a user of one of the pair of remote computing devices, the pair of remote computing devices comprising:
    a first computing device comprising a first processor and a first memory, the first computing device configured to communicate with a host computing device, and the first memory stores sample biometric data associated with the user of the first computing device; and
    a second computing device comprising a second processor and a second memory, the second computing device configured to automatically receive and transmit messages with the first computing device;
    the first computing device configured to:
        receive an authentication application from a remote computing device as part of an enrollment process;
        install the authentication application on the first computing device;
        receive, from the host computing device, an authentication request message for authenticating the user of the first computing device;
        determine, from the authentication request message received from the host computing device, a method of authentication requested by the authentication request message received from the host computing device;
        detect that the second computing device is capable of capturing authentication information that matches the method of authentication requested by the authentication request message received from the host computing device;
        transmit, in response to the detection that the second computing device is capable of capturing authentication information that matches the requested method of authentication, a biometric request message to the second computing device;
        receive captured biometric data from the second computing device, the captured biometric data being captured by the second computing device;
        electronically compare, using the authentication application installed on the first computing device, the captured biometric data to the sample biometric data stored within the first memory; and
        transmit an authentication response message to the host computing device based upon the comparison of the captured biometric data to the sample biometric data, the authentication response message indicating whether the captured biometric data matched the sample biometric data.

2. The pair of remote computing devices in accordance with claim 1, wherein the first computing device comprises a first transmitter and a first receiver for sending and receiving electronic messages, and the second computing device comprises a second transmitter and a second receiver for sending and receiving electronic messages.

3. The pair of remote computing devices in accordance with claim 2, wherein the first computing is further configured to pair with the second computing device by communicatively coupling the first transmitter to the second receiver and communicatively coupling the first receiver to the second transmitter, Wherein the pairing facilitates automatic data communication between the first computing device and the second computing device.

4. The pair of remote computing devices in accordance with claim 3, wherein the first computing device is further configured to pair with the second computing device using at least one of Wifi, near field communication (NFC), and Bluetooth.

5. The pair of remote computing devices in accordance with claim 3, wherein the data communication between the first computing device and the second computing device is encrypted.

6. The pair of remote computing devices in accordance with claim 3, wherein the first computing device is further configured to determine that the second computing device is within a predetermined radius of the first computing device before transmitting the biometric request message to the second computing device.

7. The pair of remote computing devices in accordance with claim 1, wherein to detect that the second computing device is capable of capturing authentication information that matches the requested method of authentication, the first computing device is further configured to:
  determine authentication information capturable by each of a plurality of computing devices paired with the first computing device; and
  identify the second computing device by identifying a computing device of the plurality of computing devices that is capable of capturing authentication information that matches the requested method of authentication.

8. The pair of remote computing devices in accordance with claim 1, wherein the first computing device is configured to:
  prompt the user to enroll in an authentication service provided by the host computing device for processing payment transactions using a payment account associated with the user of the first computing device; and
  transmit the sample biometric data to the host computing device, wherein the sample biometric data is stored in an authentication profile associated with the user of the first computing device, the authentication profile including an account identifier associated with the payment account for identifying payment transactions initiated with the payment account.

9. The pair of remote computing devices in accordance with claim 8, wherein the first computing device is configured to receive the authentication request in response to a payment transaction being initiated with the payment account associated with the user of the first computing device.

10. A method of authenticating a user of a first remote computing device, including a first processor and a first memory, the first memory storing sample biometric data associated with the user of the first computing device, the method comprising:
  receiving, at the first remote computing device, an authentication application as part of an enrollment process;
  installing the authentication application on the first remote computing device;
  receiving, from a host computing device, an authentication request message by the first remote computing device for authenticating the user of the first remote computing device;
  determining, by the first remote computing device, from the authentication request message received from the host computing device, a method of authentication requested by the authentication request message received from the host computing device;
  detecting that a second remote computing device is capable of capturing authentication information that matches the method of authentication requested by the authentication request message received from the host computing device;
  transmitting, in response to the detection that the second computing device is capable of capturing authentication information that matches the requested method of authentication, a biometric request message to the second remote computing device, the second remote computing device associated with the user;
  receiving, by the first remote computing device, captured biometric data from the second remote computing device, the captured biometric data being captured by the second remote computing device;
  electronically comparing, using the authentication application installed on the first remote computing device, the captured biometric data to the sample biometric data stored within the first memory; and
  transmitting, by the first remote computing device, an authentication response message to the host computing device based upon the comparison of the captured biometric data to the sample biometric data, the authentication response message indicating whether the captured biometric data matched the sample biometric data.

11. The method in accordance with claim 10, wherein transmitting the biometric request message further comprises pairing the first remote computing device with the second remote computing device by communicatively coupling a first transmitter of the first remote computing device with a second receiver of the second remote computing device and communicatively coupling a first receiver of the first remote computing device with a second transmitter of the second remote computing device, wherein the pairing facilitates automatic data communication between the first remote computing device and the second remote computing device.

12. The method in accordance with claim 11, wherein pairing with the second remote computing device further comprises pairing with the second remote computing device using at least one of Wifi, near field communication (NFC), and Bluetooth.

13. The method in accordance with claim 11, wherein the data communication between the first remote computing device and the second remote computing device is encrypted.

14. The method in accordance with claim 11, wherein pairing with the second remote computing device further comprises determining that the second remote computing device is within a predetermined radius of the first remote computing device before transmitting the biometric request message to the second computing device.

15. The method in accordance with claim 10, wherein detecting that a second remote computing device is capable of capturing authentication information that matches the requested method of authentication comprises:

determining authentication information capturable by each of a plurality of remote computing devices paired with the first remote computing device; and identifying the second remote computing device by identifying a remote computing device of the plurality of remote computing devices that is capable of capturing authentication information that matches the requested method of authentication.

16. The method in accordance with claim 10, wherein receiving the authentication request further comprises:

prompting, by the first remote computing device, the user to enroll in an authentication service provided by the host computing device for processing payment transactions using a payment account associated with the user of the first remote computing device;

transmitting the sample biometric data to the host computing device, wherein the sample biometric data is stored in an authentication profile associated with the user of the first remote computing device, the authentication profile including an account identifier associated with the payment account for identifying payment transactions initiated with the payment account; and receiving the authentication request in response to a payment transaction being initiated using the payment account.

17. Computer-readable storage media for authenticating a user of a first remote computing device, the computer-readable storage media having computer-executable instructions embodied thereon, wherein, when executed by at least one processor of the first remote computing device, the computer-executable instructions cause the processor to:

receive an authentication application as part of an enrollment process;

install the authentication application on the first remote computing device;

receive, from a host computing device, an authentication request message for authenticating the user of the first remote computing device;

determine, from the authentication request message received from the host computing device, a method of authentication requested by the authentication request message received from the host computing device;

detect that a second remote computing device is capable of capturing authentication information that matches the method of authentication requested by the authentication request message received from the host computing device;

transmit, in response to the detection that the second computing device is capable of capturing authentication information that matches the requested method of authentication, a biometric request message to the second remote computing device, the second remote computing device associated with the user;

receive captured biometric data from the second remote computing device, the captured biometric data being captured by the second remote computing device;

electronically compare, using the authentication application, the captured biometric data to sample biometric data stored with a memory associated with the first remote computing device; and transmit an authentication response message to the host computing device based upon the comparison of the captured biometric data to the sample biometric data, the authentication response message indicating whether the captured biometric data matched the sample biometric data.

18. The computer-readable storage media in accordance with claim 17, wherein the computer-executable instructions further cause the processor to pair with the second remote computing device by communicatively coupling a first transmitter of the first remote computing device with a second receiver of the second remote computing device and communicatively coupling a first receiver of the first remote computing device with a second transmitter of the second remote computing device, wherein the pairing facilitates automatic data communication between the first remote computing device and the second remote computing device.

19. The computer-readable storage media in accordance with claim 17, wherein the second remote computing device comprises a plurality of second remote computing devices within a predetermined radius of the first remote computing device, and wherein the computer-executable instructions further cause the processor to:

determine a type of biometric data requested based on the received authentication request message;

detect the type of biometric data each of the plurality of second remote computing device is configured to capture; and transmit the biometric request message to one of the second remote computing devices in response to determining the second remote computing device is configured to capture the requested biometric data.

20. The computer-readable storage media in accordance with claim 17, wherein the computer-executable instructions further cause the processor to:

prompt the user to enroll in an authentication service provided by the host computing device for processing payment transactions using a payment account associated with the user of the first computing device;

transmit the sample biometric data to the host computing device, wherein the sample biometric data is stored in an authentication profile associated with the user of the first computing device, the authentication profile including an account identifier associated with the payment account for identifying payment transactions initiated with the payment account; and receive the authentication request in response to a payment transaction being initiated with the payment account associated with the user of the first computing device.

21. A host computing device for authenticating a user of a first remote computing device, the first remote computing device configured to communicate with the host computing device and with a second remote computing device, the host computing device comprising:

a processor; and a memory for storing sample biometric data associated with a user of the first remote computing device;

the processor configured to:

process an electronic message requiring authentication of a user of the first remote computing device, the first remote computing device having transmitted the electronic message to the host computing device;

generate an authentication request message, the authentication request message specifying a method of authentication;

transmit the authentication request message to the first remote computing device to authenticate the user of the first remote computing device as an authentic user, wherein the first remote computing device is configured to: (i) determine, from the authentication request message received from the host computing device, the specified method of authentication requested by the host computing device, (ii) detect that the second remote computing device is capable of capturing authentication information that matches the method of authentication requested by the authentication request message received from the host computing device, (iii) pair with the second remote computing device, (iv) transmit a biometric request message to the second remote computing device in response to receiving the authentication request message, (v) receive captured biometric data from the second remote computing device that is captured by the second remote computing device, and (vi) communicate the captured biometric data to the host computing device;

electronically compare the captured biometric data to the sample biometric data stored with the memory; and authenticate the user as the authentic user of the first remote computing device if the captured biometric data matches the sample biometric data.

22. The host computing device in accordance with claim 21, wherein the electronic message comprises a payment transaction initiated by the user of the first remote computing device with a payment account associated with the user.

23. The host computing device in accordance with claim 21, wherein the processor is further configured to:

receive the electronic message in response to a payment transaction initiated using the payment account associated with the user; and notify at least one of a merchant and an issuing bank if the user is authenticated or declined based on the electronic comparison of the captured biometric data and the sample biometric data.

24. The host computing device in accordance with claim 21, wherein the processor is further configured to:

receive an account identifier and the sample biometric data from the first remote computing device; and enroll the user of the first remote computing device in an authentication service by storing the account identifier and the sample biometric data as an authentication profile in the memory.

25. The host computing device in accordance with claim 24, wherein the processor is further configured to determine that the user is enrolled in the authentication service by performing a lookup within the memory.

26. The host computing device in accordance with claim 21, wherein the host computing device is a payment processor configured to process the payment transaction by authenticating the user and performing at least one of authorizing the payment transaction and transmitting an authentication response message to an issuing hank for authorization, the authentication response message indicating whether the captured biometric data matched the sample biometric data.

* * * * *